Oct. 25, 1966  L. A. RICE  3,281,650
VOLTAGE AND CURRENT RESPONSIVE FIELD WINDING CURRENT CONTROL
Filed May 28, 1956
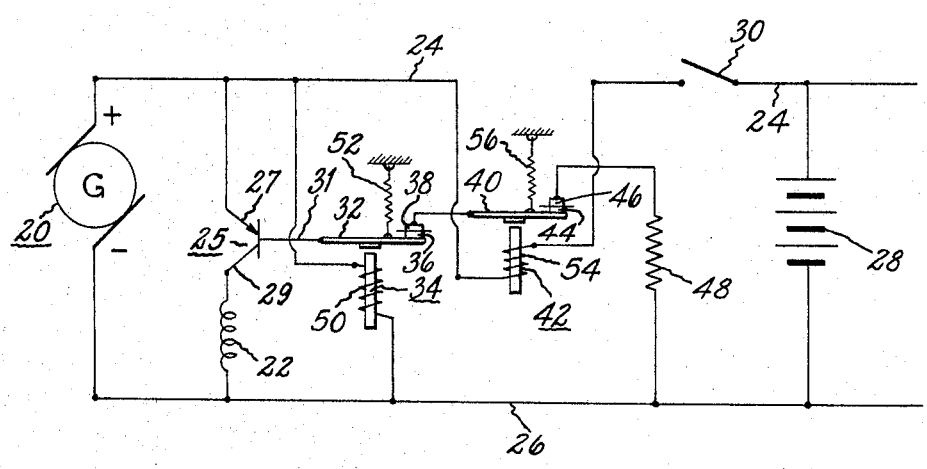
INVENTOR.
LYMAN A. RICE
BY John T. Marvin
ATTORNEY

United States Patent Office 3,281,650
Patented Oct. 25, 1966

3,281,650
VOLTAGE AND CURRENT RESPONSIVE FIELD WINDING CURRENT CONTROL
Lyman A. Rice, Anderson, Ind., assignor to General Motors Corporation, Detroit, Mich., a corporation of Delaware
Filed May 28, 1956, Ser. No. 587,739
4 Claims. (Cl. 322—25)

This invention relates to a battery charging systems for motor vehicles. It is primarily directed to a means for controlling the output of a direct current shunt wound generator which is rotated by the vehicle engine and which supplies direct current and voltage for battery charging and other purposes.

In the conventional motor vehicle battery charging system, a shunt field type generator usually supplies direct current to the various electrical equipment and to the battery for charging purposes. In these systems, the output of the generator is usually controlled by current and voltage responsive relays. These relays are connected in the field circuit and are actuated by voltage and/or current in the output circuit of the generator. When the relays are thus connected they will control the output current and voltage of the generator to prevent damage to the generator and battery etc., regardless of the speed of the vehicle and to satisfy the electrical loads which may be imposed upon the generator. While these regulating systems have proven to be largely satisfactory, as indicated by the widely accepted use thereof, difficulties frequently occur when the contact points of the relays become pitted or welded together because of the excess amount of current which may flow therethrough. The relays which are used in these systems are usually those of the electromagnetic type. These relays have contacts which open and close very rapidly and may be connected in circuit as shown on the Hartzell Patent 1,724,197. When these relays are used the current systems in the generator field must be limited if an undue amount of contact wear or pitting or welding together is to be minimized. This field current is generally limited to the value of approximately two to two and one-half amperes. Even with this small amount of current, service difficulties are frequently encountered. It has long been known that the relays would operate with a far greater efficiency and with longer life if the current across the contacts could be limited. The problem, however, defied solution in that the requirements of the battery charging system imposed on the generator were such that a high output was desired when the generator was operating at a very slow speed such as idling speed. Hence, it has been found necessary to maintain the field current at a higher value than would be ordinarily chosen if the contact life of the relays were the prime consideration.

The present invention is directed toward an improvement in these battery charging systems. This improvement is achieved by including a transistor in the field circuit for the generator and making this transistor responsive to the operation of a relay. When a transistor is thus used, the emitter and collector of the transistor are connected in circuit with the generator field and the emitter and base are cricuited through the contacts of a relay. It is well known that the emitter to collector current through a transistor is a function of the emitter to base current and that when the transistor is properly connected, a small flow of current through the base circuit will be accompanied by a considerably larger flow of current through the collector circuit. Thus if the transistor's base current is circuited through the contacts of the relay, a small amount of current through the contacts will be required to achieve a large variation in field current.

It is an object, therefore, of the present invention to provide a control for a shunt field generator in a motor vehicle battery charging system which control includes a transistor and a relay of the electromagnetic vibratory type which controls the flow of current in the base circuit of the transistor.

Another object of the present invention is to control the field of a shunt field generator in a motor vehicle battery charging system with a transistor that has its base circuit controlled by a relay that is responsive to the output of a generator.

A still further object of the present invention is to control the field of a shunt field generator in a motor vehicle battery charging system with a transistor that has its base circuit controlled by a pair of relays that have their vibrating contacts connected in series and with the base of the transistor and which are respectively responsive to the current and voltage output of the generator.

Further objects and advantages of the present invention will be apparent with the following description, reference being had to the accompanying drawing wherein a preferred embodiment of the present invention is clearly shown.

In the drawing:

The single figure shows a battery charging system for a motor vehicle according to the present invention.

In the drawing, the generator 20 has a shunt field 22 and output terminals which are connected by leads 24 and 26 to a suitable electrical load which includes the battery 28. The generator is driven by the prime mover of the motor vehicle, not shown, and supplies direct current and voltage to the battery 28 whenever the output potential of the generator 20 exceeds that of the battery and when switch 30 is closed. The switch 30, diagrammatically shown in the drawing, may be a conventional cutout relay or a suitable rectifier. Both the cutout relay and rectifier are well known. When either of these units are used the flow of current from the battery to the generator will be prevented during the periods when the output of the generator is less than the battery or when the vehicle prime mover is idle.

The output of the generator 20 is responsive to the energization of field 22. The current through the field is varied by a means which will be hereinafter described to maintain the generator output at a substantially constant value to avoid overcharging of the battery and damage to the generator. This means includes the transistor 25, which is connected so that the emitter 27 and the collector 29 are in series circuit with the field 22 between the leads 24 and 26. The base 31 of the transistor 25 is connected to the armature 32 of a voltage responsive relay 34. The armature 32 carries a movable contact 36 which engages a stationary contact 38. The stationary contact, in turn, is electrically connected with an armature 40 of a current responsive relay 42. The armature 40 has a movable contact 44 which engages a stationary contact 46. The contact 46 in turn is connected through a resistance 48 with the terminal lead 26. The voltage responsive relay 34 has its actuating coil winding 50 connected between the leads 24 and 26 and is responsive to the voltage potential therebetween. When the voltage across leads 24 and 26 is sufficiently high, the coil 50 will cause the armature 32 to be moved against the force of spring 52, which normally urges contacts 36 and 38 into engagement, so that the circuit between base 31 and the resistance 48 is broken. The current responsive relay 42 has its actuating coil winding 54 connected in lead 24 so that it is responsive to the current flowing therethrough. When the actuating winding 54 is energized, it will cause the armature 40 to move against the force of spring 56 to cause the normally closed contacts 44 and 46 to separate and interrupt the circuit between the base 31 and resistance 48.

From the above, it is manifest when the generator output is less than a predetermined amount as determined by the electrical characteristics of the actuating coils 50 and 54 and the value of resistance 48, current will flow from lead 24 through the emitter 27 of the transistor 25. This current flow will divide, for the larger portion will pass through the collector 29, and field 22 to lead 26. The smaller current will flow through base 31 of the transistor 25 through a circuit which includes the closed contacts 36 and 38, 44 and 46, and resistance 48 to lead 26. When, however, the voltage output of the generator exceeds a predetermined value, the coil winding 50 will be sufficiently energized to open contacts 36 and 38 and break the emitter 27 to base 31 circuit. A well known characteristic of a transistor of the type herein contemplated is that when the current ceases to flow through the base circuit likewise the flow of current through the collector circuit will cease. Thus when the base circuit of the transistor 25 is broken, current will no longer flow through the field 22 and the output of the generator will decrease to a value sufficient to permit contacts 36 and 38 to close. These voltage regulator contacts 36 and 38 will operate with a high frequency and will continuously make and interrupt the base circuit to maintain the output of the generator at a safe value for the battery. Likewise, when the current flowing in the lead 24 exceeds a predetermined value, the actuating coil 54 will cause the contacts 44 and 46 to open. This will break the circuit through the emitter and base and will thus cause the flow of current through field 22 to be interrupted until the current output of the generator is reduced sufficiently so contacts 44 and 46 are re-engaged by the spring 56.

From the above, it is manifest that only a small amount of current will be necessary to pass through the contacts of the regulator relays. This small amount of current will be insufficient to cause the contact to become welded or pitted by the arcing which is caused by the high currents which occur in the systems which are presently employed.

While the embodiment of the present invention as herein disclosed constitutes a preferred form, it is to be understood that other forms might be adopted.

What is claimed is as follows:

1. A combined current and voltage regulating circuit for a motor vehicle comprising, a generator having a field winding, a two lead direct current output circuit connected with said generator to be energized thereby, a transistor having base, emitter and collector electrodes, means connecting one side of said field winding with one of said output leads, means connecting the emitter to collector circuit of said transistor between the opposite side of said field winding and said other output lead whereby the current passing through the field is a function of emitter to collector conduction of said transistor, a first relay of the electromagnetic-vibratory type having a first pair of switch contacts and a first actuating coil, said relay being operative to maintain said contacts closed when said actuating coil is energized with a current below a predetermined value and being operative to open said contacts when the actuating coil is energized with a current above said predetermined value, a second relay of the electromagnetic-vibratory type having a second pair of switch contacts and a second actuating coil, said second relay being operative to maintain said second relay contacts closed when said second actuating coil is energized with a voltage below a predetermined value and being operative to open said second switch contacts when said second coil winding is energized with a voltage above said predetermined value, means connecting the actuating coil of said first relay in series with one of said output leads, means connecting the actuating coil of said second relay across said output leads whereby said first and second actuating coils respond respectively to current and voltage output of said generator, a base circuit for said transistor connected between the base electrode of said transistor and the D.C. output lead that is connected with the collector side of the emitter to collector circuit of the transistor, said base circuit including, said first and second relay contacts, a conductor means connecting said relay contacts in series, a conductor means connecting one side of one of said pair of relay contacts with said base electrode and a conductor means connecting one side of the other of said pair of relay contacts with the output lead that is connected with the collector side of the emitter to collector circuit of the transistor, the resistance of said base circuit being of a value to permit base current to flow when said first and second relay switch contacts are closed and said base circuit being open circuited where said first or second relay switch contacts are open whereby the conduction of the transistor from emitter to collector is controlled as a function of base circuit resistance, and an electrical load connected across said output leads.

2. In a motor vehicle electrical system, the combination comprising, a generator having a field winding, a two lead direct current output circuit connected with said generator to be energized thereby, a transistor having base, emitter and collector electrodes, means connecting one side of said field winding with one of said output leads, means connecting the emitter to collector circuit of said transistor between the opposite side of said field winding and said other output terminal whereby the current passing through the field is a function of emitter to collector conduction of said transistor, a relay of the electromagnetic-vibratory type having a pair of switch contacts and an actuating coil, said relay being operative to maintain said contacts closed when said actuating coil is energized with a generator output that is below a predetermined value and being operative to open said contacts when the actuating coil is energized with generator output above said predetermined value, means connecting said actuating coil in circuit with said output leads whereby said relay contacts are closed when the output of the generator is below said predetermined value and are opened when the output of the generator rises above said predetermined value, a base circuit for said transistor connected between the base electrode of said transistor and the D.C. output lead that is connected with the collector side of the emitter to collector circuit of the transistor, said base circuit including, said relay switch contacts, a conductor means connected between one side of the relay switch contacts and the base electrode of the transistor and a conductor means connecting the opposite side of said switch contacts with the output lead that is connected with the collector side of the emitter to collector circuit of the transistor, the resistance of said base circuit being of a value to permit base current to flow when said relay switch contacts are closed and said base circuit being open circuited when said relay switch contacts are open whereby the conduction of the transistor from emitter to collector is controlled as a function of base circuit resistance, and an electrical load connected across said output leads.

3. In an electrical system, the combination comprising: a direct current generator having an output circuit and an energizable field, leads connected to said output circuit, and transistor means connected in circuit with said field, voltage sensing means responsive to voltage across said leads, current sensing means responsive to current in said leads, and rapidly cycling current controlling means responsive to said voltage and current sensing means and so connected in circuit with said transistor means as to cause said transistor means to abruptly switch from a fully conductive to a nonconductive condition and vice versa to control current flow through said field in response to current flow in and voltage across said leads.

4. In an electrical system, the combination comprising: a direct current generator having an output circuit and an energizable field, leads connected to said output circuit, a transistor having a base, emitter and collector electrodes, said emitter and collector being connected in series with said field across said leads, rapidly cycling current controlling means having output terminals and including first means connected to said leads and responsive to the voltage thereacross and a second means connected to said leads and responsive to the current flowing therethrough, said current controlling means being effective to abruptly change from a first state in which current may readily flow between said output terminals to a second state in which said current flow is substantially blocked, said first and second means causing said current controlling means to change between said two states depending upon whether the current flow in or voltage across said leads is above or below desired values, and means connecting said output terminals with said base so as to abruptly vary current flow through said base in response to current flow in and voltage across said leads.

References Cited by the Examiner
UNITED STATES PATENTS

| | | | |
|---|---|---|---|
| 1,724,197 | 8/1929 | Hartzell | 200—90.1 |
| 1,936,692 | 11/1933 | Stoller | 322—72 X |
| 2,524,035 | 10/1950 | Bordeen et al. | 330—32 |
| 2,593,241 | 4/1952 | Aust | 320—33 |
| 2,617,907 | 11/1952 | Umbarger et al. | 322—25 X |
| 2,740,086 | 5/1956 | Evans et al. | 322—28 |

JOHN F. COUCH, *Primary Examiner.*

JOHN E. HENDRICKS, ORIS L. RADER, LLOYD McCOLLUM, MILTON O. HIRSHFIELD, *Examiners.*

H. M. BAXTER, R. J. CRAWFORD, S. WEINBERG, *Assistant Examiners.*